Jan. 3, 1967   H. E. SIMONS   3,295,215
STRIP STEEL MEASURING WHEEL
Filed Aug. 14, 1964
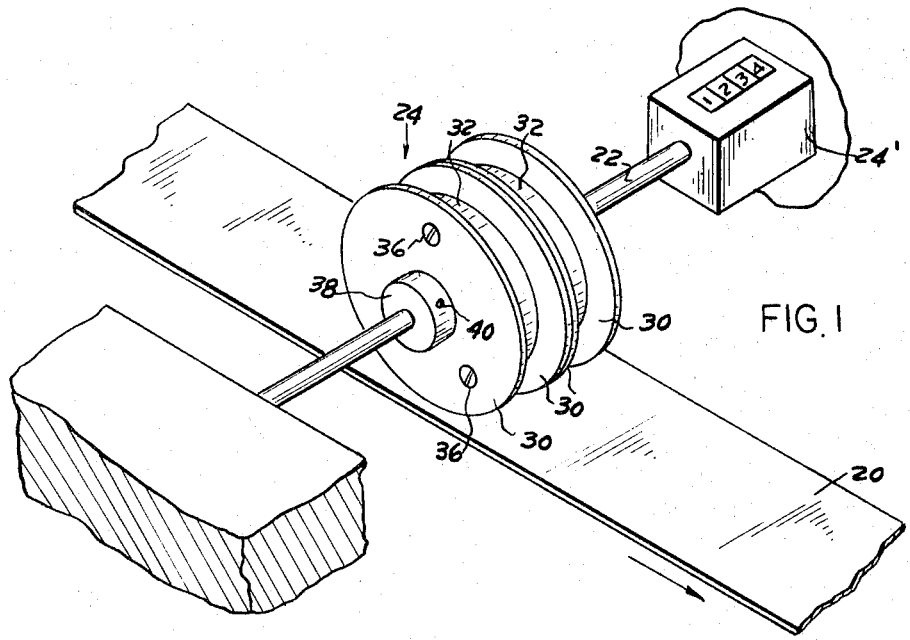
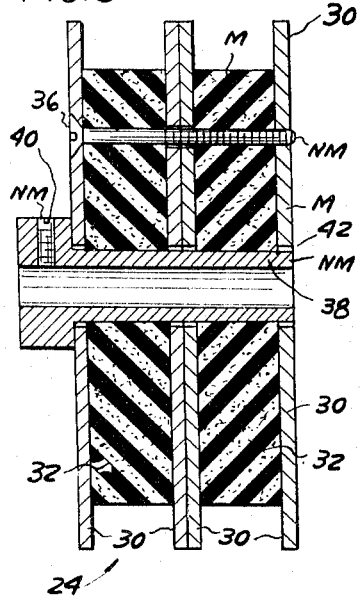
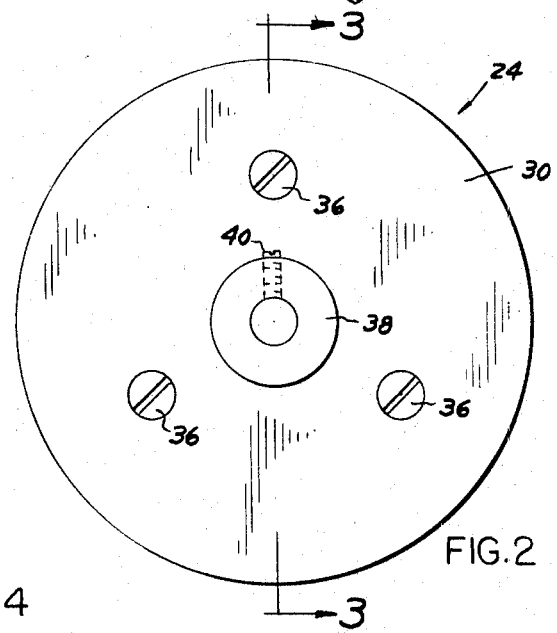
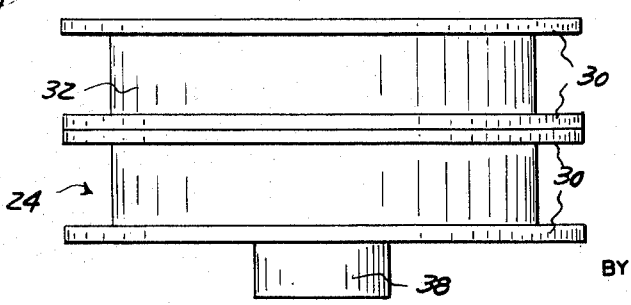
INVENTOR
HECTOR E. SIMONS
BY
ATTORNEYS

United States Patent Office 3,295,215
Patented Jan. 3, 1967

3,295,215
STRIP STEEL MEASURING WHEEL
Hector E. Simons, Farmington, Mich., assignor to American Steel Corporation, Detroit, Mich., a corporation of Michigan
Filed Aug. 14, 1964, Ser. No. 389,655
4 Claims. (Cl. 33—134)

This application relates to measuring wheels. It discloses a measuring wheel especially useful for linearly measuring a rapidly moving and vibrating ribbon of steel, measurement being effected by relating the circumference of the wheel to the unit of measurement and counting the number of revolutions of the wheel caused by the moving ribbon engaging such wheel.

This application relates specifically to a measuring wheel having as its novel features, among others, the fact that magnetic flux is used to prevent slippage between the wheel and the ribbon, such slippage interfering with accurate measurement of the moving ribbon, and such slippage often being caused by the presence of oil on the surface of the ribbon that is being measured. The use of magnetic flux in the device herein disclosed has been found to eliminate slippage and reach a high level of accuracy, whether the strip be continuously running or being intermittently moved, as for example when the strip is being fed to machine tools such as stamping and blanking presses.

An embodiment of the invention has been perfected and is shown by way of a preferred example in the appended drawing.

In this drawing:

FIG. 1 is a perspective view showing a moving ribbon of steel being measured by a measuring wheel connected to a counter which counts the revolutions of the wheel and thus gives a reading of the length of ribbon traversing the wheel.

FIG. 2 is an elevation view of the wheel, per se.

FIG. 3 is a transverse section as if on line 3–3 of FIG 2.

FIG. 4 is a top plan view as if looking down on FIG 2.

The drawing shows a means for linearly measuring the rapidly moving and vibrating ribbon 20 of steel. Such means comprises a shaft 22, a counter 24 actuated by such shaft, and a wheel referenced generally 24 on and fixed to shaft 22, with the edge of the wheel being frictionally engaged by the ribbon whereby the wheel and shaft are rotated by the moving ribbon.

In the preferred form shown, the wheel comprises one or more magnetic material steel discs 30 and a magnetized rubber disc 32 in face to face contact with the steel discs. The rubber disc 32 is of smaller diameter than the steel discs 30 so as to be out of contact with ribbon 20, the latter engaging steel discs 30. Rubber disc 32 is magnetized by having imbedded therein many small magnets, such as magnetized particles, magnetizing the steel disc and, as well, the edges of all discs 30—30—32.

In the preferred form, there are two steel discs 30—30 between which is the smaller diameter magnetized rubber disc 32, with the parts being held in assembly by non-magnetic cross bolts 36. Magnetizable iron particles are moulded into the disc 32.

The drawing shows an arrangement for increasing the amount of magnetic pull, and in such arrangement there are employed two pairs of steel discs 30 and two rubber discs 32.

All of the discs, 30 and 32, are centrally apertured with the apertures in alinement so as to receive and thus be mounted on a non-magnetic material hub 38 adapted to be secured to the shaft 22 by a non-magnetic set screw 40.

The rubber discs 32 are secured directly to the hub 38 with a tight press fit of the discs 32 on the hub 38. The steel discs 30, on the other hand, have their central apertures considerably larger than the hub 38 to provide clearance at 42 between the steel discs and the hub 38 to isolate the steel disc from the hub magnetically. This arrangement is of special value in that the vibrating ribbon 20 does not transmit its vibrations to the steel discs 30 and thus cause bouncing of the measuring wheel, rather there is a shock absorbing effect which reduces the tendency of the measuring wheel to bounce and this is due to the resilient connection established between the hub 38 and the discs 30, this being provided by the rubber disc, a shock insulator between the hub 38 and the steel discs 30.

Alternately, in operation, any vibration transmitted by the steel ribbon 20 to metal discs 30 is dampened by the rubber disc 32 and is not transmitted to the counter shaft 32.

It will, of course, be understood that the steel discs can be of any desired circumference, but for practical reasons the steel discs are ground precisely so that their circumferences are exactly one foot, enabling the number of revolutions to be read as the number of feet of travel of the ribbon 20.

Rubber discs 32 are slightly smaller in diameter than the steel discs 30 so that foreign material picked up from the surface of the steel ribbon 20 will be caused to adhere to the rubber discs and thus be prevented from remaining on the circumferences of the steel discs and thus cause errors in measurement.

Essentially then, the measuring device hereof includes as basic elements a steel disc 30 and a magnetized rubber disc 32, in face to face contact, with the rubber disc 32 being of smaller diameter than the steel disc.

While the steel disc means could be, in its elementary form, a single disc, it is preferred to provide two steel discs 30—30 on opposite sides of the rubber disc 32. While in its elemental form, the device may comprise a single rubber disc and either a single steel disc or two steel discs, in its preferred form the device includes a plurality of rubber discs 32 and a plurality of pairs of steel discs as for example, the two rubber discs 32 and the four steel discs 30 as shown.

It will also be observed that whereas parts 30 are of magnetic steel, and parts 32 are of magnetic rubber, that parts 36, 38 and 40 are of non-magnetic material.

Now having described the measuring wheel herein disclosed, reference should be had to the claims which follow.

1. In a means for linearly measuring a rapidly moving and vibrating ribbon of steel comprising a shaft, a counter actuated thereby, and a wheel on and fixed to said shaft, with the edge of said wheel being engaged by said ribbon whereby the wheel and shaft are rotated by the moving ribbon;

said wheel comprising two magnetic material discs in face-to-face contact, one of said discs being of smaller diameter than the other of said discs so that its edge is out of contact with said ribbon while the edge of the large disc is engaged by said ribbon;

the larger disc being of magnetic steel and the smaller disc being of rubber with magnetized particles therein;

and a non-magnetic material hub mounting the wheel on the shaft, with the rubber disc being secured directly to the hub, and with the steel disc being free of the hub but secured to the rubber disc.

2. Means according to claim 1 wherein a non-magnetic set screw secures the hub to the shaft.

3. In a means for linearly measuring a rapidly moving and vibrating ribbon of steel comprising a shaft, a counter actuated thereby, and a wheel on and fixed to said shaft, with the edge of said wheel being engaged by said ribbon whereby the wheel and shaft are rotated by the moving ribbon;

said wheel comprising two magnetic material discs and a third magnetic material disc between them and in face-to-face contact with them, said disc being of smaller diameter than said first two discs, so that its edge is out of contact with said ribbon while the edges of the larger discs are engaged by said ribbon; the larger discs being of magnetic steel and the smaller disc being of rubber with magnetized particles therein;

and a non-magnetic material hub mounting the wheel on the shaft, with the rubber disc being secured directly to the hub, and with the steel discs being free of the hub but secured to the rubber disc.

4. Means according to claim 3 wherein a non-magnetic set screw secures the hub to the shaft.

References Cited by the Examiner

UNITED STATES PATENTS

| | | | |
|---|---|---|---|
| 2,228,913 | 1/1941 | Martin | 271—74.1 |
| 2,588,085 | 3/1952 | Clouse | 271—74.1 |
| 2,596,322 | 5/1952 | Zumwalt | 198—41 |
| 2,637,552 | 5/1953 | Watson | 33—21 |
| 2,959,832 | 11/1960 | Baermann | 252—62.5 |

FOREIGN PATENTS

| | | |
|---|---|---|
| 178,330 | 4/1954 | Austria. |
| 866,253 | 9/1953 | Germany. |

LEONARD FORMAN, *Primary Examiner.*

WILLIAM K. QUARLES, JR., *Assistant Examiner.*